(12) United States Patent
Yamazaki et al.

(10) Patent No.: US 8,243,691 B2
(45) Date of Patent: Aug. 14, 2012

(54) COMMUNICATION CONTROL METHOD, COMMUNICATION SYSTEM, COMMUNICATION CONTROL APPARATUS AND WIRELESS BASE STATION

(75) Inventors: Chiharu Yamazaki, Yokohama (JP); Kugo Morita, Yokohama (JP)

(73) Assignee: Kyocera Corporation, Kyoto (JP)

( * ) Notice: Subject to any disclaimer, the term of this patent is extended or adjusted under 35 U.S.C. 154(b) by 313 days.

(21) Appl. No.: 12/593,819

(22) PCT Filed: Mar. 25, 2008

(86) PCT No.: PCT/JP2008/055581
§ 371 (c)(1),
(2), (4) Date: Feb. 8, 2010

(87) PCT Pub. No.: WO2008/123250
PCT Pub. Date: Oct. 16, 2008

(65) Prior Publication Data
US 2010/0128673 A1    May 27, 2010

(30) Foreign Application Priority Data

Mar. 29, 2007 (JP) .................................. 2007-089084
Mar. 29, 2007 (JP) .................................. 2007-089102

(51) Int. Cl.
*H04W 4/00* (2009.01)
(52) U.S. Cl. ...................................................... 370/334
(58) Field of Classification Search .................. None
See application file for complete search history.

(56) References Cited

U.S. PATENT DOCUMENTS

| | | | |
|---|---|---|---|
| 6,879,845 B2 | 4/2005 | Suzuki et al. | 455/562.1 |
| 7,103,022 B2 | 9/2006 | Yoshino et al. | 370/330 |
| 8,009,578 B2 * | 8/2011 | Kishigami et al. | 370/252 |
| 2002/0068590 A1 | 6/2002 | Suzuki et al. | 455/466 |
| 2002/0115474 A1 | 8/2002 | Yoshino et al. | 455/562 |
| 2003/0224829 A1* | 12/2003 | Ishiguro et al. | 455/562.1 |
| 2004/0264558 A1* | 12/2004 | Chae et al. | 375/148 |
| 2006/0189356 A1* | 8/2006 | Obayashi | 455/562.1 |
| 2006/0240827 A1* | 10/2006 | Dunn et al. | 455/436 |

FOREIGN PATENT DOCUMENTS

| | | |
|---|---|---|
| JP | 09-219615 | 8/1997 |
| JP | 11-308037 | 11/1999 |
| JP | 2002-232350 | 8/2002 |
| JP | 2002-319894 | 10/2002 |
| JP | 2004-356993 | 12/2004 |
| JP | 2005-348454 | 12/2005 |

* cited by examiner

*Primary Examiner* — Raj Jain
(74) *Attorney, Agent, or Firm* — DLA Piper LLP (US)

(57) ABSTRACT

A communication control method for a communication system stores location information indicating an interference region by neighboring wireless base stations, a first weighting factor for one wireless base station to direct its beam to the interference region, and a second weighting factor for the other wireless base station to direct its beam, correspondingly to one another in an interference table The system judges whether a terminal is located in the interference region by obtaining weighting factors adopted by each of the neighboring wireless base stations while the one wireless base station communicates with the terminal, compares the weighting factors to the first and second weighting factors stored in the interference table, and controls beam generation of the other wireless base station to prevent its interference when the terminal is located in the interference region.

12 Claims, 10 Drawing Sheets

(a)

(b)

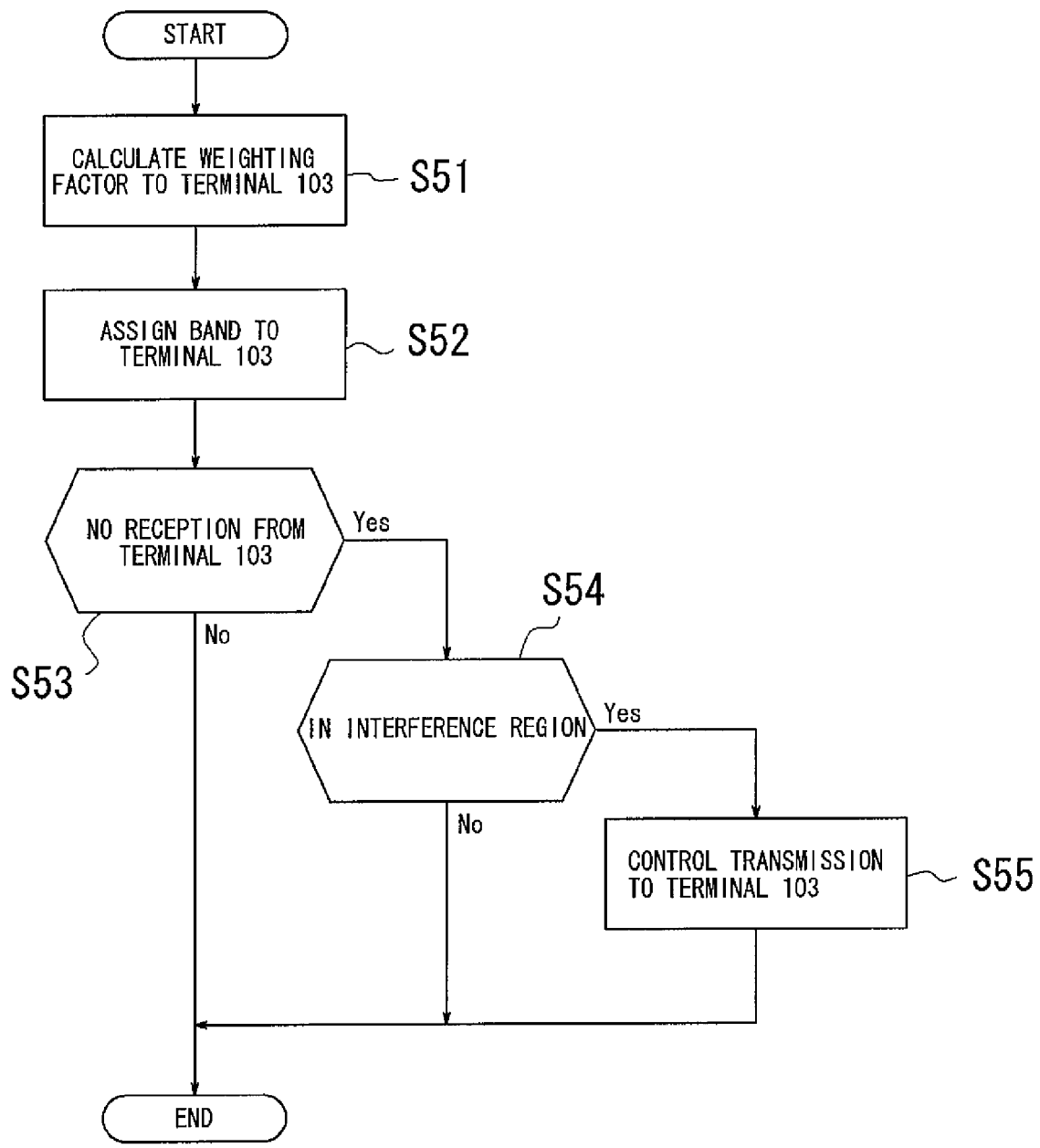

COMMUNICATION CONTROL METHOD, COMMUNICATION SYSTEM, COMMUNICATION CONTROL APPARATUS AND WIRELESS BASE STATION

CROSS REFERENCE TO RELATED APPLICATION

This application is a national stage of international application No. PCT/JP2008/055581 filed on Mar. 25, 2008, which also claims priority to and the benefit of Japanese Patent Application No. 2007-89084 filed Mar. 29, 2007 and Japanese Patent Application No. 2007-89102 filed on Mar. 29, 2007, the entire contents of those are incorporated herein by reference.

TECHNICAL FIELD

The present invention relates to a communication control method, a communication system, a communication control apparatus and a wireless base station.

BACKGROUND ART

A cellular system is conventionally known as a mobile communication system. In addition, a standardization of high-speed wireless communication such as WiMAX (Worldwide Interoperability for Microwave Access), for example, has been recently promoted.

The cellular system prevents radio waves from neighboring wireless base stations from interfering with one another by use of different frequency bands for the neighboring wireless base stations. The cellular system thus establishes a wireless communication network by use of a plurality of different frequency bands.

In contrast, WiMAX adopts TDD (Time Division Duplexing) which transmits and receives radio waves on the same frequency by dividing time for uplink and downlink. By synchronization of frame structures for each wireless base station, WiMAX prevents radio waves transmitted from one terminal from acting as interference radio waves to radio waves transmitted from another wireless base station with which another terminal is communicating.

However, it is assumed that, in light of an effective usage of limited frequencies, unlike the cellular system, it is difficult to assign different frequency bands to the neighboring wireless base stations in a wireless communication system such as WiMAX which uses wide frequency band. For that reason, using the same frequency band at neighboring wireless base stations generates a communication interference region therebetween because of the synchronization of frames between the wireless base stations.

When the communication interference region is generated, since a terminal in the region simultaneously receives radio waves transmitted from neighboring wireless base stations, there is a concern about difficulty to separate the radio waves transmitted from one another in a region where reception intensities of the transmitted radio waves are at approximately the same level, which leads to a failure of handover to the neighboring wireless base station and disconnection.

Meanwhile, in order to reduce a dead region caused by interference, Japanese Patent Application Laid-open No. 11-308037, for example, suggests to form a null in directions of a plurality of wireless base stations by adopting adaptive arrays to antennas of the plurality of wireless base stations.

SUMMARY OF INVENTION

Technical Problem

The technique disclosed in Japanese Patent Application Laid-open No. 11-308037 described above, however, relates to a site diversity scheme for improving a transmission quality in a terminal by synthesizing radio waves simultaneously transmitted from a plurality of base stations and cannot be adopted for a system in which a terminal communicates with a single wireless base station.

Accordingly, a first object of the present invention concerning such a condition is to provide a communication control method, a communication system and a communication control apparatus that achieve a stable communication without an interference by a neighboring wireless base station.

Moreover, a second object of the present invention is to provide a communication control method, a communication system and a wireless base station that achieve a stable communication with quick handover to a neighboring wireless base station.

Solution to Problem

In order to achieve the first object set forth above, the invention according to a first aspect is that a communication control method for the communication system including a plurality of wireless base stations having adaptive array antennas and a communication control apparatus for controlling the plurality of wireless base stations, comprises:

storing location information indicating an interference region by a first wireless base station and a second wireless base station neighboring each other among the plurality of wireless base stations, a first weighting factor for the first wireless base station to direct a beam to the interference region, and a second weighting factor for the second wireless base station to direct a beam to the interference region, correspondingly to one another in an interference table;

obtaining weighting factors adopted by the first base stations and the second base station respectively while the first wireless base station communicates with a wireless communication apparatus, and judging whether the wireless communication apparatus is located in the interference region by the second wireless base station based on a comparison of the weighting factors obtained and the first and the second weighting factors stored in the interference table; and controlling beam generation of the second wireless base station, when the wireless communication apparatus is located in the interference region, so as to prevent a radio wave transmitted from the second wireless base station from interfering with the wireless communication apparatus.

The invention according to a second aspect is that the communication control method according to the first aspect further comprises:

in order to store the location information, the first weighting factor and the second weighting factor in the interference table, an obtainment step for obtaining information on a communication quality required for the wireless communication apparatus wirelessly connected to the first wireless base station;

a determination step for determining whether the communication quality required for the wireless communication apparatus meets a predetermined quality based on the obtained information on the communication quality;

a second weighting factor calculation step for calculating the second weighting factor so that the second wireless base station directs a beam to an interference region confirmation objective apparatus by defining the wireless communication apparatus as the interference region confirmation objective apparatus and based on location information obtained from the interference region confirmation objective apparatus, when the communication quality does not meet the predetermined quality as a result of the determination; and a signal obtainment recognition step for recognizing, after the second wireless base station generates a beam based on the second weighting factor calculated, whether the first wireless base station has obtained a signal from the interference region confirmation objective apparatus, wherein when the first wireless base station has not obtained a signal from the interference region confirmation objective apparatus as a result of the recognition, the interference region confirmation objective apparatus is assumed to be located in the interference region by the first wireless base station and the second wireless base station, and the first weighting factor used by the first wireless base station to direct a beam to the interference region confirmation objective apparatus, the second weighting factor calculated in the second weighting factor calculation step, and the location information obtained from the interference region confirmation objective apparatus are stored correspondingly to one another in the interference table.

The invention according to a third aspect is that the communication control method according to the first aspect further comprises:

in order to store the location information, the first weighting factor and the second weighting factor in the interference table, a judgment step for judging whether location information obtained from the wireless communication apparatus wirelessly connected to the first wireless base station is stored in the interference table;

an obtainment step for obtaining information on a communication quality required for the wireless communication apparatus when the location information obtained from the wireless communication apparatus is not stored in the interference table as a result of the judgment;

a determination step for determining whether the communication quality required for the wireless communication apparatus meets a predetermined quality based on the obtained information on the communication quality;

a second weighting factor calculation step for calculating the second weighting factor so that the second wireless base station directs a beam to an interference region confirmation objective apparatus by defining the wireless communication apparatus as the interference region confirmation objective apparatus and based on the location information obtained from the interference region confirmation objective apparatus, when the communication quality does not meet the predetermined quality as a result of the determination; and a signal obtainment recognition step for recognizing, after the second wireless base station generates a beam based on the second weighting factor calculated, whether the first wireless base station has obtained a signal from the interference region confirmation objective apparatus, wherein when the first wireless base station has not obtained a signal from the interference region confirmation objective apparatus as a result of the recognition, the interference region confirmation objective apparatus is assumed to be located in the interference region by the first wireless base station and the second wireless base station, and the first weighting factor used by the first wireless base station to direct a beam to the interference region confirmation objective apparatus, the second weighting factor calculated in the second weighting factor calculation step, and the location information obtained from the interference region confirmation objective apparatus are stored correspondingly to one another in the interference table.

The invention according to a fourth aspect is that, in the communication control method according to the second aspect, a band corresponding to the communication quality is obtained and a band for confirmation of the interference region is assigned for the interference region confirmation objective apparatus.

The invention according to a fifth aspect is that, in the communication control method according to the third aspect, a band corresponding to the communication quality is obtained and a band for confirmation of the interference region is assigned for the interference region confirmation objective apparatus.

In order to achieve the first object set forth above, the invention according to a sixth aspect is that, in a communication system including a plurality of wireless base stations having adaptive array antennas and the communication control apparatus for controlling the plurality of wireless base stations, each of the plurality of the wireless base station comprises:
a communication control apparatus communication unit for transmitting a weighting factor adopted for beam generation to the communication control apparatus and receiving a weighting factor from the communication control apparatus, and the communication control apparatus comprises:
a reception unit for receiving the weighting factor transmitted from each of the wireless base stations;
an interference table for storing location information indicating an interference region by a first wireless base station and a second wireless base station neighboring each other among the plurality of wireless base stations, a first weighting factor for the first wireless base station to direct a beam to the interference region and a second weighting factor for the second wireless base station to direct a beam to the interference region, correspondingly to one another;
an interference region judging unit for obtaining weighting factors adopted by the first base station and the second base station respectively while the first wireless base station communicates with a wireless communication apparatus and judging whether the wireless communication apparatus is located in the interference region by the second wireless base station based on a comparison of the weighting factors obtained and the first and the second weighting factors stored in the interference table;
a weighting factor calculation unit for calculating a third weighting factor for controlling beam generation of the second wireless base station so as to prevent a radio wave transmitted from the second wireless base station from interfering with the wireless communication apparatus based on the weighting factor of the first wireless base station received by the reception unit, when the wireless communication apparatus is judged as being located in the interference region by the interference region judging unit; and a transmission unit for transmitting the third weighting factor calculated to the second wireless base station, wherein beam generation of the second wireless base station is controlled based on the third weighting factor transmitted from the communication control apparatus.

Moreover, in order to achieve the first object set forth above, the invention according to a seventh aspect is that a communication control apparatus for controlling a plurality of wireless base stations having adaptive array antennas, comprises:

a weighting factor obtainment unit for obtaining a weighting factor adopted for beam generation from each of the plurality of wireless base stations;

an interference table for storing location information indicating an interference region by a first wireless base station and a second wireless base station neighboring each other among the plurality of wireless base stations, a first weighting factor for the first wireless base station to direct a beam to the interference region and a second weighting factor for the second wireless base station to direct a beam to the interference region, correspondingly to one another;

an interference region judging unit for obtaining weighting factors adopted by the first base station and the second base station respectively while the first wireless base station communicates with a wireless communication apparatus and judging whether the wireless communication apparatus is located in the interference region by the second wireless base station based on a comparison of the weighting factors obtained and the first and the second weighting factors stored in the interference table;

a weighting factor calculation unit for calculating a third weighting factor for controlling beam generation of the second wireless base station so as to prevent a radio wave transmitted from the second wireless base station from interfering with the wireless communication apparatus based on the weighting factor of the first wireless base station obtained by the weighting factor obtainment unit, when the wireless communication apparatus is judged as being located in the interference region by the interference region judging unit; and a transmission unit for transmitting the third weighting factor calculated to the second wireless base station.

In order to achieve the second object set forth above, the invention according to an eighth aspect is that a communication control method for a communication system including a plurality of wireless base stations having adaptive array antennas, comprises:

detecting whether there is reception of a signal transmitted from a wireless communication apparatus by a first wireless base station communicating with the wireless communication apparatus; and controlling transmission of the first wireless base station so that the wireless communication apparatus performs handover to a second wireless base station neighboring the first wireless base station when the reception of a signal transmitted from the wireless communication apparatus is failed.

The invention according to a ninth aspect is that, in the communication control method according to the eighth aspect, transmission of the first wireless base station is stopped or a transmission output of the first wireless base station is reduced when the reception of a signal transmitted from the wireless communication apparatus is failed.

The invention according to a tenth aspect is that a communication control method for a communication system including a plurality of wireless base stations having adaptive array antennas and a communication control apparatus for controlling the plurality of wireless base stations, comprises:

storing location information indicating an interference region where communication of each of the wireless base stations is interfered by a neighboring wireless base station and a weighting factor for the wireless base station to direct a beam at least to the interference region, correspondingly to each other in an interference table;

obtaining a weighting factor adopted at least by a first wireless base station while a wireless communication apparatus communicates with the first wireless base station among the plurality of wireless base stations, and judging whether the wireless communication apparatus is located in the interference region based on a comparison of the weighting factor obtained and a weighting factor of a corresponding wireless base station stored in the interference table; and controlling transmission of the first wireless base station so that the wireless communication apparatus performs handover to a second wireless base station neighboring the first wireless base station, when the wireless communication apparatus is located in the interference region as a result of the judgment.

The invention according to an eleventh aspect is that the communication control method according to the tenth aspect further comprises detecting whether there is reception of a signal transmitted from the wireless communication apparatus by the first wireless base station communicating with, the wireless communication apparatus, and judging whether the wireless communication apparatus is located in the interference region when the reception of a signal transmitted from the wireless communication apparatus is failed.

The invention according to an twelfth aspect is that, in the communication control method according to the tenth aspect, transmission of the first wireless base station is stopped or a transmission output of the first wireless base station is reduced when the wireless communication apparatus is located in the interference region.

The invention according to an thirteenth aspect is that, in the communication control method according to the eleventh aspect, transmission of the first wireless base station is stopped or a transmission output of the first wireless base station is reduced when the wireless communication apparatus is located in the interference region.

Moreover, in order to achieve the second object set forth above, the invention according to a fourteenth aspect is that, in a communication system including a plurality of wireless base stations having adaptive array antennas and a communication control apparatus for controlling the plurality of wireless base stations, each of the plurality of wireless base stations comprises:

a communication control apparatus communication unit for transmitting a weighting factor adopted for beam generation to the communication control apparatus and receiving a judging result about an interference region from the communication control apparatus, and the communication control apparatus comprises:

a reception unit for receiving the weighting factor transmitted from each of the wireless base stations;

an interference table for storing location information indicating an interference region where communication of each of the wireless base stations is interfered by a neighboring wireless base station and a weighting factor for the wireless base station to direct a beam at least to the interference region, correspondingly to each other;

an interference region judging unit for obtaining a weighting factor adopted at least by a first base station while a wireless communication apparatus communicates with the first wireless base station among the plurality of wireless base stations and judging whether the wireless communication apparatus is located in the interference region based on a comparison of the weighting factor obtained and a weighting factor of a corresponding wireless base station stored in the interference table; and a transmission unit for transmitting a judging result about the interference region by the interference region judging unit to the first wireless base station, wherein transmission of the first wireless base station is controlled so that the wireless communication apparatus performs handover to a second wireless base station neighboring the first wireless base station when the wireless communication apparatus is judged as being located in the interference region by the interference region judging unit.

Furthermore, in order to achieve the second object set forth above, the invention according to a fifteenth aspect is that a wireless base station having an adaptive array antenna, comprises:

a signal detection unit for detecting whether there is reception of a signal transmitted from a wireless communication apparatus with which the wireless base station is communicating; and a transmission control unit for controlling transmission so that the wireless communication apparatus performs handover to a neighboring wireless base station, when the signal detection unit fails to receive a signal transmitted from the wireless communication apparatus.

Advantageous Effects on Invention

According to the communication control method of the present invention to achieve the first object, location information indicating an interference region by a first wireless base station and a second wireless base station neighboring each other, a first weighting factor for the first wireless base station to direct a beam to the interference region and a second weighting factor for the second wireless base station to direct a beam to the interference region are stored correspondingly to one another in an interference table. In addition, while the first wireless base station communicates with the wireless communication apparatus, weighting factors adopted by the first wireless base station and the second wireless base station respectively are obtained, and it is judged whether the wireless communication apparatus is located in the interference region by the second wireless base station based on a comparison of weighting factors obtained and the first and the second weighting factors stored in the interference table. When the wireless communication apparatus is located in the interference region as a result, beam generation of the second wireless base station is controlled to prevent a radio wave transmitted of the second wireless base station from interfering with the wireless communication apparatus. Thereby, it is possible to obtain an interference region caused between wireless communication apparatuses neighboring each other by relating to a weighting factor of each of the wireless base stations, which enables the stable communication without interference by a neighboring wireless base station.

Furthermore, according to the communication control method of the present invention to achieve the second object, when a wireless communication apparatus comes into an interference region during communication with a wireless base station, the transmission of the wireless base station is controlled so that the wireless communication apparatus performs handover to a neighboring wireless base station. Thereby, it enables the stable communication by reducing a period (dead period) for the wireless communication apparatus to be in the interference region is reduced and the wireless communication apparatus is capable of performing handover quickly to the neighboring wireless base station.

BRIEF DESCRIPTION OF DRAWINGS

FIG. 10 is a flow chart illustrating specific operations of the communication system shown in FIG. 8.

Figure 1:
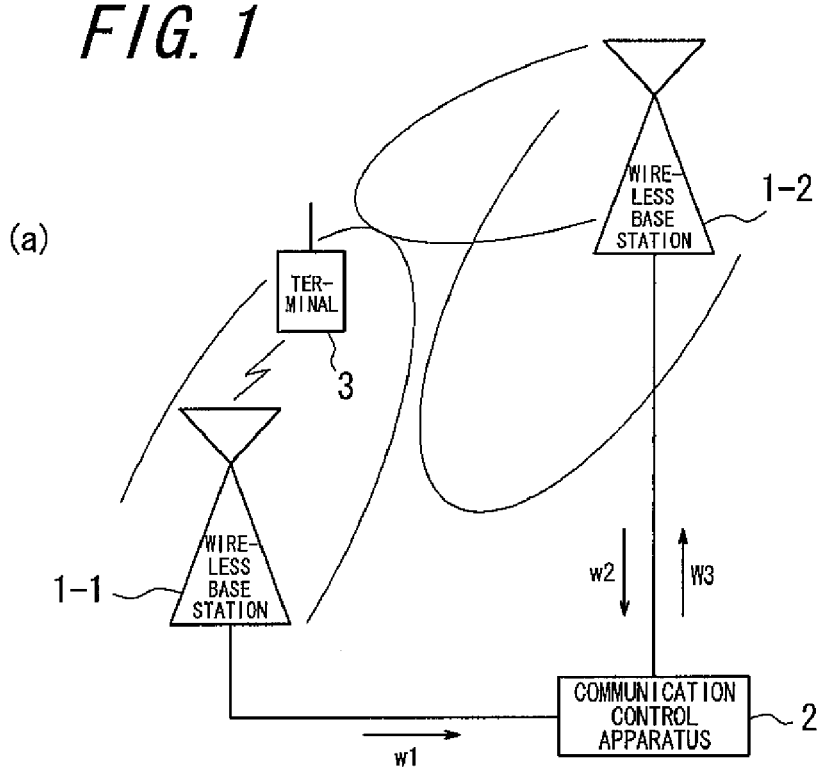
FIG. 1 is a diagram illustrating a principle of a communication system according to a first embodiment of the present invention.
Figure 1:
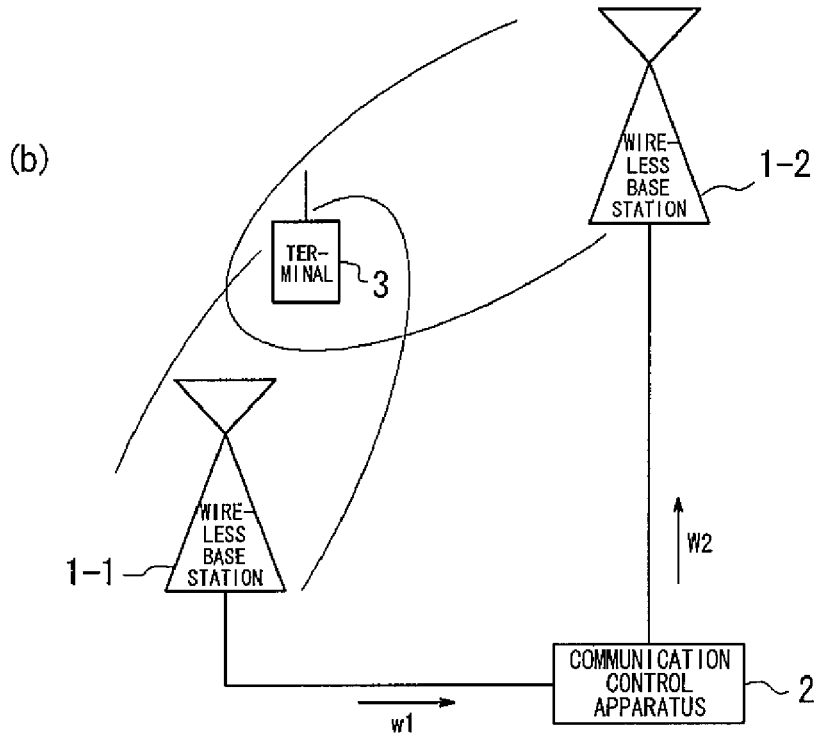

REFERENCE SIGNS LIST 1-1 to 1-3 wireless base station
2 communication control apparatus
3, 4 terminal (wireless communication apparatus)
5 building
11 terminal communication unit
12 communication control apparatus communication unit
13 control unit
15 beam generation unit
21 wireless base station communication unit
22 neighboring wireless base station extraction unit
23 interference table
24 weighting factor calculation unit
25 control unit
101-1, 101-2 wireless base station
102 communication control apparatus
103 terminal (wireless communication apparatus)
111 terminal communication unit
112 communication control apparatus communication unit
113 control unit
115 beam generation unit
121 wireless base station communication unit 122 interference region judging unit
123 interference table
125 control unit

DESCRIPTION OF EMBODIMENTS

Embodiments of the present invention will be described with reference to the accompanying drawings.

First Embodiment

FIG. 1 is a diagram illustrating a principle of a communication system according to a first embodiment of the present invention. The communication system shown in FIG. 1 is provided with a plurality of wireless base stations 1-1, 1-2, . . . and a communication control apparatus 2 for controlling the plurality of wireless base stations. Each of the wireless base stations 1-1, 1-2, . . . (hereinafter referred to as a wireless base station 1 as well when indicating a single wireless base station) is capable of wirelessly communicating with a terminal (wireless communication apparatus) 3 located in a communication area of the wireless base station 1 by use of the same frequency band and TDD with frame synchronization between the wireless base stations. In addition, each wireless base station 1 has a plurality of antennas and adopts an adaptive array antenna to improve a link state by controlling directionality of the antenna to the terminal 3 communicating therewith. The terminal 3 has a position detecting function such as GPS and the likes.

In the communication system of the present embodiment, the communication control apparatus 2 is provided with an interference table, as described later, in which location information of an interference region by the wireless base stations 1-1 and 1-2 neighboring each other, a first weighting factor W1 for the wireless base station 1-1 to direct its beam to the interference region, and a second weighting factor W2 for the wireless base station 1-2 to direct its beam to the interference region are stored correspondingly.

The communication control apparatus 2, based on the weighting factor (W1 or W2) used when one of the wireless base station neighboring each other directs its beam to the interference region, calculates a weighting factor (third weighting factor) W3 for one of the wireless base stations to generate a beam interpolating a dead region of the other one of the wireless base stations by avoiding the interference region, and stores the third weighting factor W3 in the interference table.

Thus, as shown in FIG. 1(a), for example, when the wireless base station 1-1 communicates with the terminal 3, the wireless base station 1-1 obtains location information from the terminal 3 communicating therewith and transmits the information to the communication control apparatus 2. Moreover, the wireless base station 1-1 calculates a weighting factor w1 by which a reception intensity thereof becomes maximum based on a signal received from the terminal 3, and synthesizes the weighting factor w1 with the reception signal as well as with a transmission signal so as to control directionality of the antenna to direct a beam to the terminal 3, that is, to generate a beam having the directionality to the terminal 3. In the communication system of the present embodiment, the weighting factor w1 calculated by and actually adopted for the wireless base station 1-1 is transmitted to the communication control apparatus 2.

Based on the location information of the terminal 3 in communication obtained from the wireless base station 1-1, the communication control apparatus 2 searches for corresponding location information in the interference table.

When the corresponding location information is found out, there is a possibility that the terminal 3 locates in the interference region by the wireless base station 1-2. In such a case, when obtaining the location information of the terminal 3, the communication control apparatus 2 obtains the weighting factors w1 and w2 that are actually adopted by, the wireless base stations 1-1 and 1-2, respectively, and determines whether there is an identical combination based on a comparison of the weighting factors w1 and w2 obtained and the first and the second weighting factors W1 and W2 stored in the interference table.

When there is the identical combination as a result, the terminal 3 is judged as being located in the interference region by the wireless base station 1-2, and a third weighting factor W3 for the wireless base station 1-2 to generate a beam interpolating a dead region by a beam of the wireless base station 1-1 is obtained from the interference table and transmitted to the wireless base station 1-2.

Thereby, the wireless base station 1-2 neighboring the wireless base station 1-1 generates a beam to interpolate the dead region of the wireless base station 1-1 based on the third weighting factor W3 received from the communication control apparatus 2. As shown in FIG. 1(a), the terminal 3 communicating with the wireless base station 1-1 is not interfered by the neighboring wireless base station 1-2 and the dead region of the wireless base station 1-1 is interpolated by the wireless base station 1-2.

When there is no identical combination between the actual weighting factors w1 and w2 obtained from the wireless base stations 1-1 and 1-2 and the first and the second weighting factors W1 and W2 stored in the interference table, the terminal 3 is judged as being located out of the interference region by the wireless base station 1-2 and the control of the beam generation of the wireless base station 1-2 is not performed.

On the other hand, when the location information of the terminal 3 in communication obtained from the wireless base station 1-1 is not found out in the interference table, the communication control apparatus 2 determines whether a communication quality required for the terminal 3 meets a predetermined quality. When the communication quality does not meet the predetermined quality as a result, the terminal 3 is defined as a target terminal for confirmation of interference region (interference region confirmation objective apparatus) and the weighting factor W2 for the neighboring wireless base station 1-2 to direct a beam to the terminal 3 is calculated based on the location information obtained from the terminal 3. The weighting factor W2 calculated is transmitted to the wireless base station 1-2. Thereby, the wireless base station 1-2 generates a beam to direct to the terminal 3 as shown in FIG. 1(b).

Subsequently, the communication control apparatus 2 inquires the wireless base station 1-1 about whether the wireless base station 1-1 has received a signal transmitted from the terminal 3. When the wireless base station 1-1 could not receive a signal, the terminal 3 is judged as being located in the interference region by the neighboring wireless base station 1-2. In such a case, the weighting factor w1 obtained from the wireless base station 1-1 is defined as the first weighting factor W1, while the weighting factor W2 calculated by the communication control apparatus 2 is defined as the second weighting factor W2, and the first and the second weighting factors W1 and W2 are stored in the interference table together with the location information of the terminal 3 obtained from the wireless base station 1-1, correspondingly to one another. Moreover, the communication control apparatus 2 calculates the third weighting factor W3 for the wireless base station 1-2 to generate a beam interpolating the dead region of the wireless base station 1-1 by avoiding the interference region based on the weighting factor w1 of the wireless base station 1-1, and stores the third weighting factor W3 calculated in the interference table.

Although the dead region of the wireless base station 1-1 communicating with the terminal 3 is interpolated by the neighboring wireless base station 1-2 in FIG. 1 for simplification of description, it is also possible to interpolate it by a plurality of neighboring wireless base stations.

Figure 2:
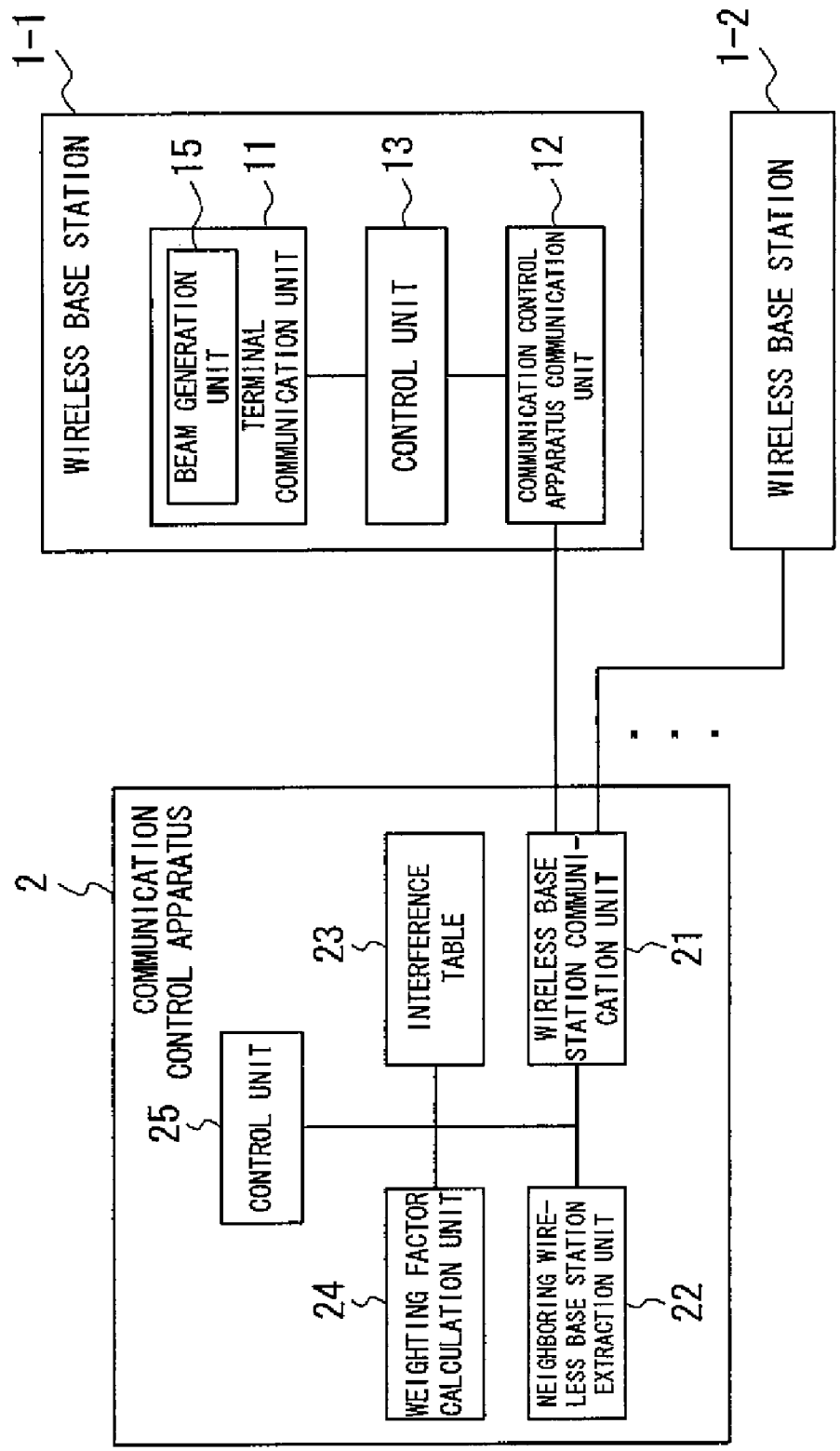
FIG. 2 is a functional block diagram illustrating a schematic constitution of main sections of each wireless base station and a communication control apparatus in the communication system shown in FIG. 1.

FIG. 2 is a functional block diagram illustrating a schematic constitution of main sections of each wireless base station 1 and the communication control apparatus 2 in the communication system shown in FIG. 1. Each of the wireless base station 1 is similarly constituted and provided with a terminal communication unit 11 for wirelessly communicating with the terminal 3, a communication control apparatus communication unit 12 for wiredly or wirelessly communicating with the communication control apparatus 2, and a control unit 13 for controlling the entire operation. The terminal communication unit 11 is provided with a beam generation unit 15 which controls directionality of the antenna based on the weighting factor w1 calculated based on a signal received from the terminal communicating therewith and the weighting factor W2 or the third weighting factor W3 received from the communication control apparatus 2.

The communication control apparatus 2 is provided with a wireless base station communication unit 21 for communicating with the wireless base station 1, a neighboring wireless base station extraction unit 22, an interference table 23, a weighting factor calculation unit 24, and a control unit 25 for controlling the apparatus entirely.

Figure 3:
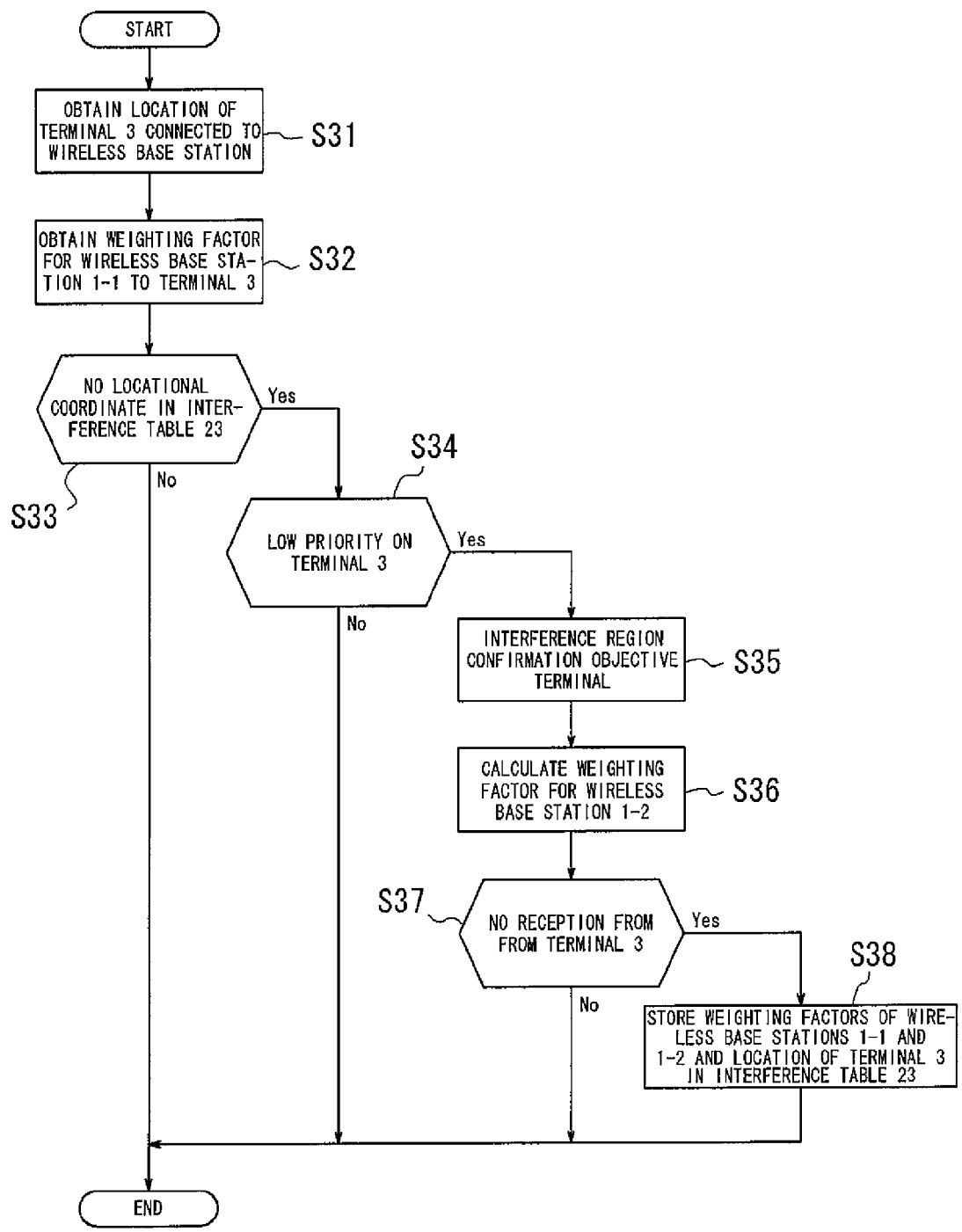
FIG. 3 is a flow chart illustrating a generation process of an interference table shown in FIG. 2.

FIG. 3 is a flow chart illustrating a generation process of the interference table 23 shown in FIG. 2. Following is specified operations of the present embodiment described with reference to FIG. 3.

For example, when the wireless base station 1-1 is communicating with the terminal 3, the wireless, base station 1-1 obtains the location information of the terminal 3 therefrom by the terminal communication unit 11 and transmits the location information to the communication control apparatus 2 by the communication control apparatus communication unit 12. In addition, the wireless base station 1-1 also transmits the weighting factor w1, calculated based on a signal received from the terminal 3 to be adopted for beam generation of the beam generation unit 15 of the terminal communication unit 11, to the communication control apparatus 2 by the communication control apparatus communication unit 12. Likewise, other wireless base stations including the wireless base station 1-2 transmit weighting factors currently adopted for beam generation and location information of a terminal communicating therewith, if any, to the communication control apparatus 2.

As shown in FIG. 3, the communication control apparatus 2 first obtains the location information of the terminal 3 transmitted from the wireless base station 1-1 via the wireless base station communication unit 21 (step S31) and then obtains the first weighting factor w1 adopted for beam generation of the wireless base terminal 1-1 to the terminal 3 (step S32).

Subsequently, the communication control apparatus 2 searches whether the location information obtained from the wireless base station 1-1 by the control unit 25 is already stored in the interference table 23 (step S33). When the location information is already stored, there is a possibility for the terminal 3 to be located in the interference region by the wireless base station 1-2. Thus, in such a case, when obtaining the location information of the terminal 3, the communication control apparatus 2, as described above, obtains the weighting factors w1 and w2 actually adopted by the wireless base stations 1-1 and 1-2, respectively, and judges whether the terminal 3 is located in the interference region by searching for the identical combination of the first weighting factor W1 and the second weighting factor W2 in the interference table 23.

When the terminal 3 is judged as being located in the interference region by the wireless base station 1-2 as a result, the communication control apparatus 2 obtains the third weighting factor W3 from the interference table 23 for the wireless base station 1-2 to generate a beam interpolating the dead region of the beam of the wireless base station 1-1, and transmits the W3 to the wireless base station 1-2 via the wireless base station communication unit 21. Thereby, as shown in FIG. 1(*a*), the terminal 3 is not interfered by radio waves transmitted from the neighboring wireless base station 1-2 and the dead region of the wireless base station 1-1 is interpolated by the wireless base station 1-2.

On the contrary, when the location information of the terminal 3 in communicating obtained from the wireless base station 1-1 is not stored in the interference table 23, the control unit 25 determines whether the communication quality required for the terminal 3 meets the predetermined quality (step S34). When the communication quality does not meet the predetermined quality as a result, the terminal 3 is defined as an interference region confirmation objective terminal (step S35) and the weighting factor W2 for the neighboring wireless base station 1-2 to direct a beam to the terminal 3 is calculated based on the location information obtained from the terminal 3 (step S36).

At this point, the communication quality is determined based on a priority of the communication of the terminal 3, for example, at the step S34. For a communication with a low requirement for a real-time performance (such as Web access and the likes), for example, the terminal 3 is defined as the interference region confirmation objective terminal.

Even for communication for which the real-time performance is required (VoIP (Voice over IP) and the likes, for example), when there is a enough band to assign a band to the terminal 3 in the wireless base station 1-1, the terminal 3 is defined as the interference region confirmation objective terminal. For example, although an RTP (Real Time Transport Protocol) packet is submitted at intervals of 20 ms in a VoIP communication, it is 5 ms in one frame in a WiMAX communication and thus possible to interpolate by a retransmission process before submission of the following VoIP packet even if one packet of VoIP is destroyed once. Therefore, the terminal 3 is defined as the interference region confirmation objective terminal in this case.

In such a case, in order to confirm whether the terminal 3 is interfered by the wireless base station 1-2 at a step S37 described below, it is required to obtain a band for retransmission from the wireless base station 1-1 to the terminal 3 in a frame from the communication control apparatus 2 after the timing of the confirmation of the interference. In a case where a signal transmitted from the terminal 3 is not received by the wireless base station 1-1 at the timing of the confirmation of the interference, it is required to transmit at a retransmission timing ensured in advance. In a case where a signal transmitted from the terminal 3 is received by the wireless base station 1-1 at the timing of the confirmation of the interference, the band for retransmission ensured in advance is destroyed or assigned to another terminal when it is determined the terminal needs the band.

At the step S36, in addition, a wireless base station included in a circle having the location information of the terminal 3 as a center thereof and a distance capable of communicating therein as a radius thereof is extracted as a neighboring wireless base station (except for the wireless base station 1-1 which is being connected) by the neighboring wireless base station extraction unit 22. Then, for the extracted neighboring wireless base station, the weighting factor W2, which is a factor of interference of communication to the terminal 3, is calculated based on the location information of the terminal 3 by the weighting factor calculation unit 24. When a plurality of neighboring wireless base stations are extracted, the weighting factor calculation unit 24 calculates the weighting factor W2 in ascending order of the distance and retains information indicating that there is a wireless base station not calculated yet at the same place in the interference table 23. For the neighboring wireless base station at the same place (the distance is equal to or shorter than a predetermined value), the weighting factor calculation unit 24 preferentially calculates the weighting factor W2 of the base station not calculated yet.

After calculating the weighting factor W2 by the weighting factor calculation unit 24, the communication control apparatus 2 transmits the W2 from the wireless base station communication unit 21 to a corresponding wireless base station (the wireless base stations 1-2 in this case). Thereby, the wireless base stations 1-2 controls the beam generation unit 15 to direct a beam to the terminal 3 as shown in FIG. 1(b).

Then, the communication control apparatus 2 inquires the wireless base station 1-1 about whether the wireless base station 1-1 has received a signal transmitted from the terminal 3 (step S37). In a case where a message indicating success in the reception of the signal is received from the wireless base station 1-1 as a result, it is assumed that there is no interference with the terminal 3 and the process is finished without storing anything in the interference table 23. On the other hand, in a case where a message indicating failure in the reception of the signal transmitted from the terminal 3 is received from the wireless base station 1-1, the terminal 3 is assumed to be interfered by radio waves transmitted from the wireless base station 1-2, and the weighting factor w1 obtained from the wireless base station 1-1 as the first weighting factor W1, the weighting factor W2 calculated by the weighting factor calculation unit 24 as the second weighting factor W2, and the location information of the terminal 3 obtained from the wireless base station 1-1 as the location information indicating the interference region are stored in the interference table 23 correspondingly to one another in a recording format shown in FIG. 4, for example (step S38).

Figure 4:
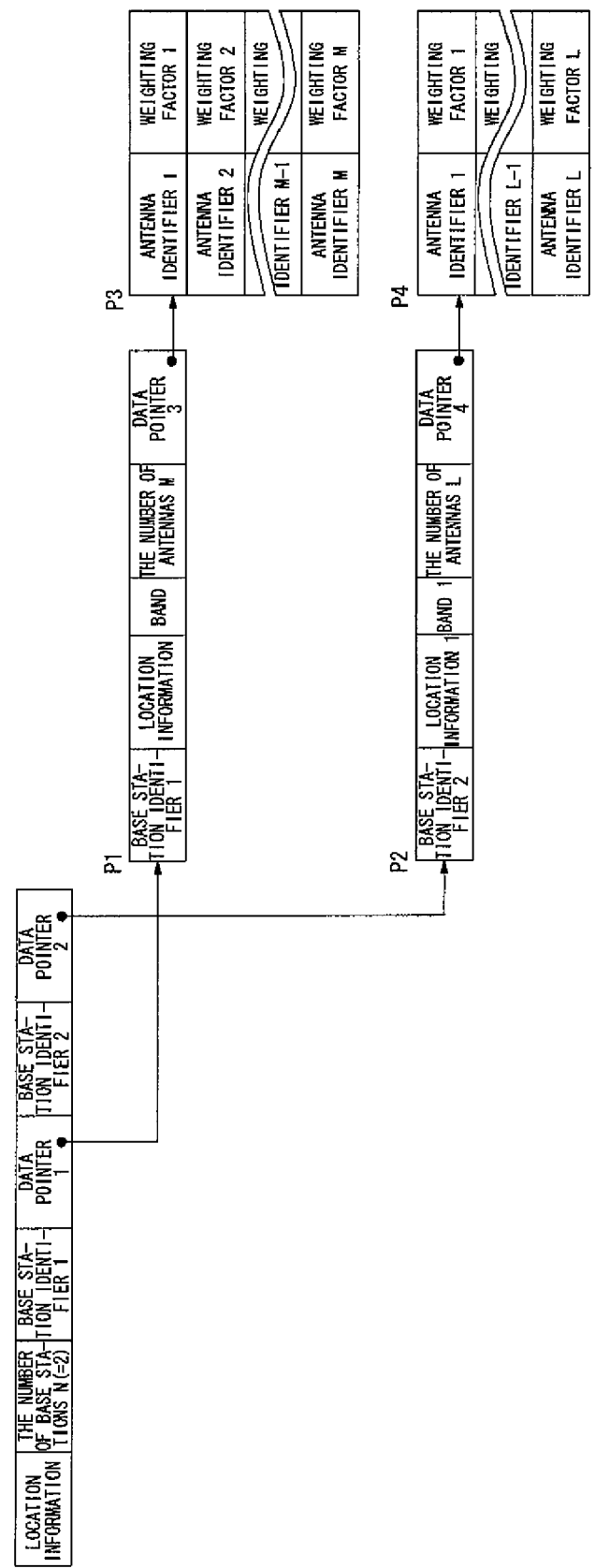
FIG. 4 shows an example of a recording format of the interference table shown in FIG. 2.

The recording format shown in FIG. 4 has the number of related wireless base stations, identifiers corresponding to the number of wireless base stations, and data pointers with regard to the location information. The weighting factor of each wireless base station is stored at the address indicated by the data pointer following the identifier. For example, as shown by addresses P1 and P2, the address holding a base station identifier, location information, carrier band information, the number of antennas and the data pointer is provided and, to the data pointer, as shown by addresses P3 and P4, weighting factors are stored correspondingly to antenna identifiers arranged in a corresponding wireless base station. It is also possible to generate an index file aside for each identifier of the wireless base station to link to information having weighting factors relating to each wireless base station. For example, the address P1 as information on weights is linked to the identifier 1 of the wireless base station.

Figure 5:
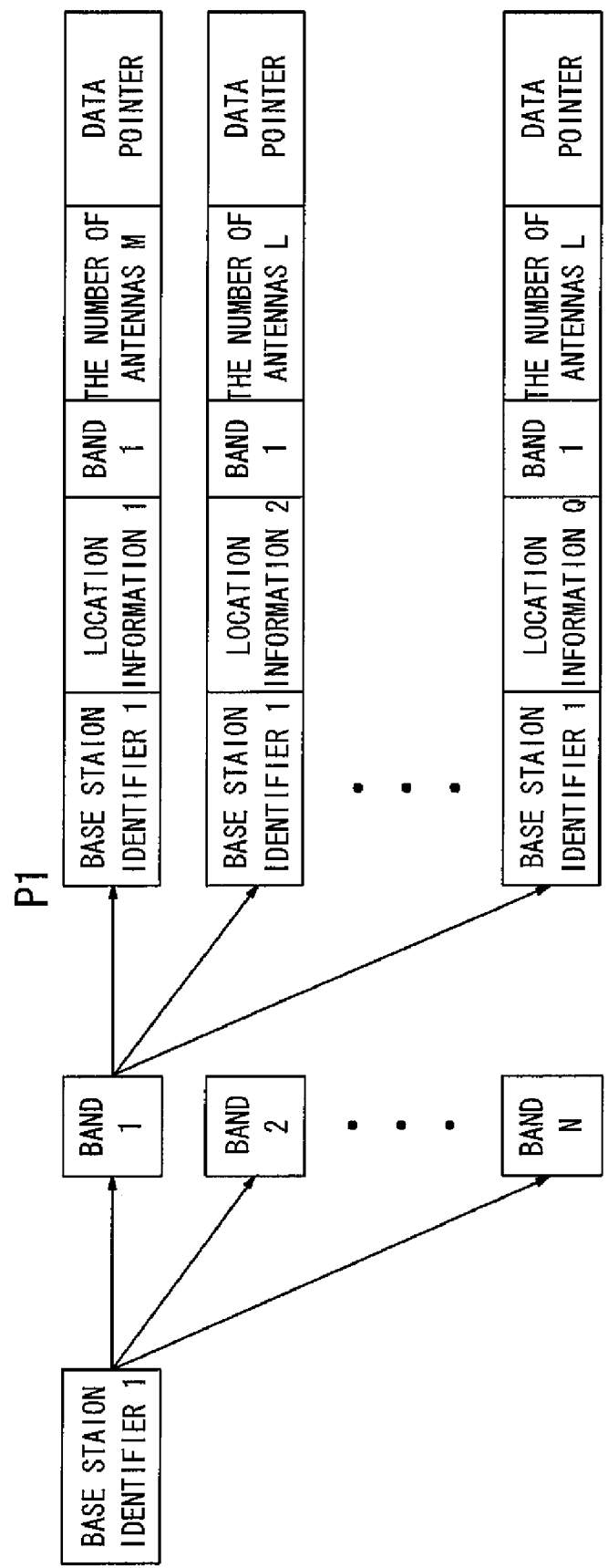
FIG. 5 shows the recording format shown in FIG. 4 in detail.

In the communication control apparatus 2 of the present embodiment, in order to judge whether the terminal 3 is located in the interference region, weighting factors of the wireless base station communicating with the terminal 3 are arranged for the corresponding first weighting factor to be easily searched from the wireless base station communicating with the terminal 3. For that reason, it is preferred to create an assembly of the data pointers (address P1, for example) for each wireless base station. In addition, since a propagation character differs in each carrier frequency, the recording format is structured so as to branch the search according to the carrier frequency as shown in FIG. 5, for example.

Furthermore, the communication control apparatus 2 of the present embodiment, at the step S38 in FIG. 3, stores the first weighting factor W1 of the wireless base station 1-1 and the second weighting factor W2 of the wireless base station 1-2 in the interference table 23 correspondingly to location information of the interference region and, along with that, calculates the third weighting factor W3 based on the first weighting factor W1 so that the wireless base station 1-2 generates a beam to interpolate the dead region of the wireless base station 1-1 by avoiding the interference region with the weighting factor calculation unit 24, and stores the third weighting factor calculated in the interference table 23 correspondingly to location information or the first weighting factor W1.

Therefore, the wireless base station communication unit 21 of the communication control apparatus 2 constitutes a reception unit, a transmission unit and a weighting factor obtaining unit, while the control unit 25 constitutes an interference region judging unit in the present embodiment.

Following is a description of an example of a calculation process of the third weighting factor calculated by the weighting factor calculation unit 24 of the communication control apparatus 2. Preliminary to the calculation of the third weighting factor, the weighting factor calculation unit 24 first searches for a dead region of the wireless base station 1-1. In order to search the dead region, for example, map information is disposed on a voxel space and a building (having a reflection factor) based on the map information is constituted on the voxel space. In addition, antenna arrangement information of each neighboring wireless base station 1 including the wireless base station 1-1 is obtained. The directionality of the antenna is set in priority to weight (first weighting factor) to the terminal 3 for the wireless base station 1-1 communicating with the terminal 3, while the antenna is set to be non-directional for a wireless base station not wirelessly connected to another terminal.

Figure 6:
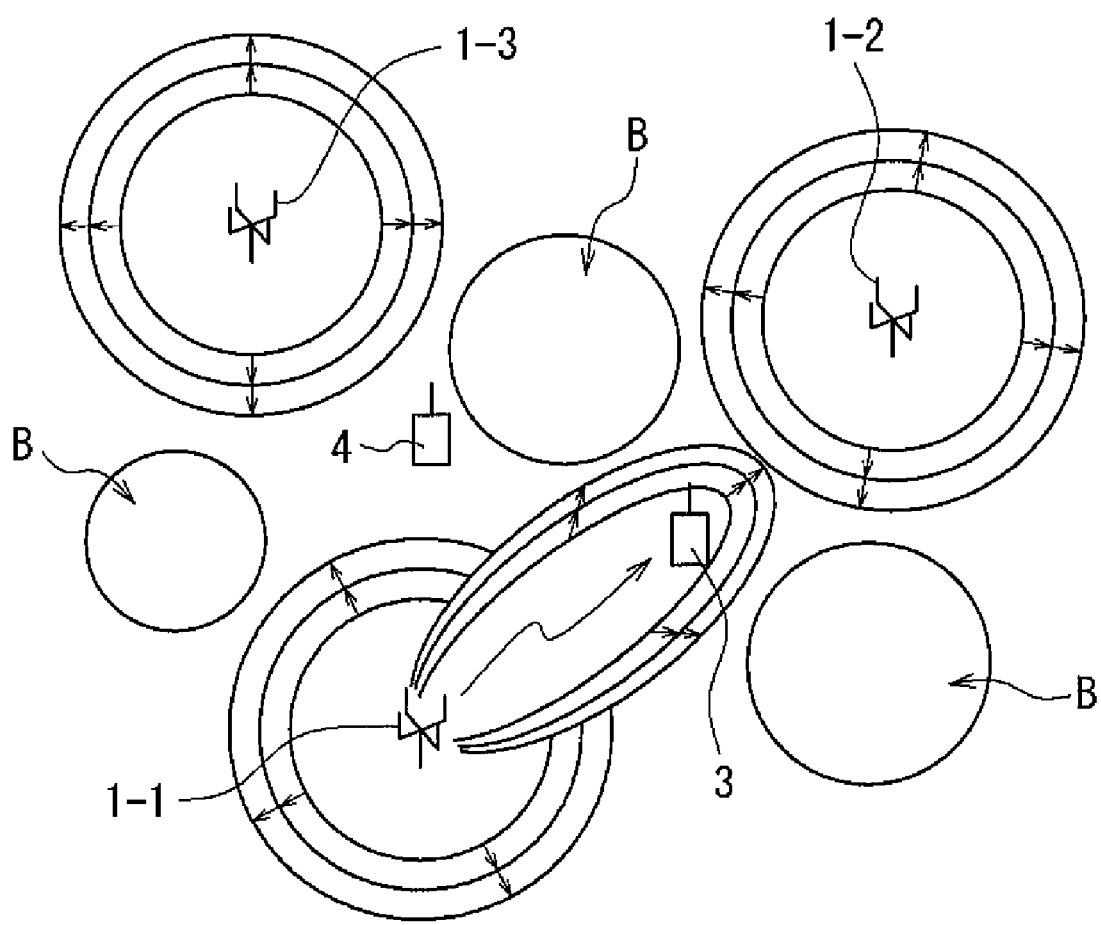
FIG. 6 is a diagram illustrating a search process of a dead region of the wireless base station.

For example, as shown in FIG. 6, when the terminals 3 and 4 are located in an area where there are the wireless base stations 1-1 to 1-3 and the terminal 3 is communicating with the wireless base station 1-1 while the terminal 4 is in a standby state, since the wireless base stations 1-2 and 1-3 are not communicating with either terminal, antennas of the wireless base stations 1-2 and 1-3 are set to be non-directional. For the wireless base station 1-1 communicating with the terminal 3, directionality of antenna(s) used for the communication with the terminal 3 is set in priority to the weight to the terminal 3, while antenna(s) unrelated to the communication is/are set to be non-directional.

In this state, the weighting factor calculation unit 24 obtains a transmission power property of each wireless base station 1 and evenly expands the transmission power property with each wireless base station 1 as a center thereof. At this point, when the transmission power property is expanded on the voxel space and hit a building and the likes, an expansion direction is changed in accordance with a reflection property at a hitting point.

The weighting factor calculation unit 24 repeats an expansion step of the transmission power property and, when the transmission power property of the wireless base station 1-1 communicating with the terminal 3 and the transmission power property of the neighboring wireless base station 1-2 come in contact with each other, stops the expansion step and, in this state, sets a region not included in the transmission power property of each of the wireless base station 1-1 and neighboring wireless base stations 1-2 and 1-3 as a dead region B of the wireless base station 1-1.

After thereby searching for the dead region B of the wireless base station 1-1, the weighting factor calculation unit 24 calculates weight (third weighting factor) for a region including the dead region B for each of the neighboring wireless base stations 1-2 and 1-3 by use of antennas uninvolved in communication with a terminal.

Figure 7:
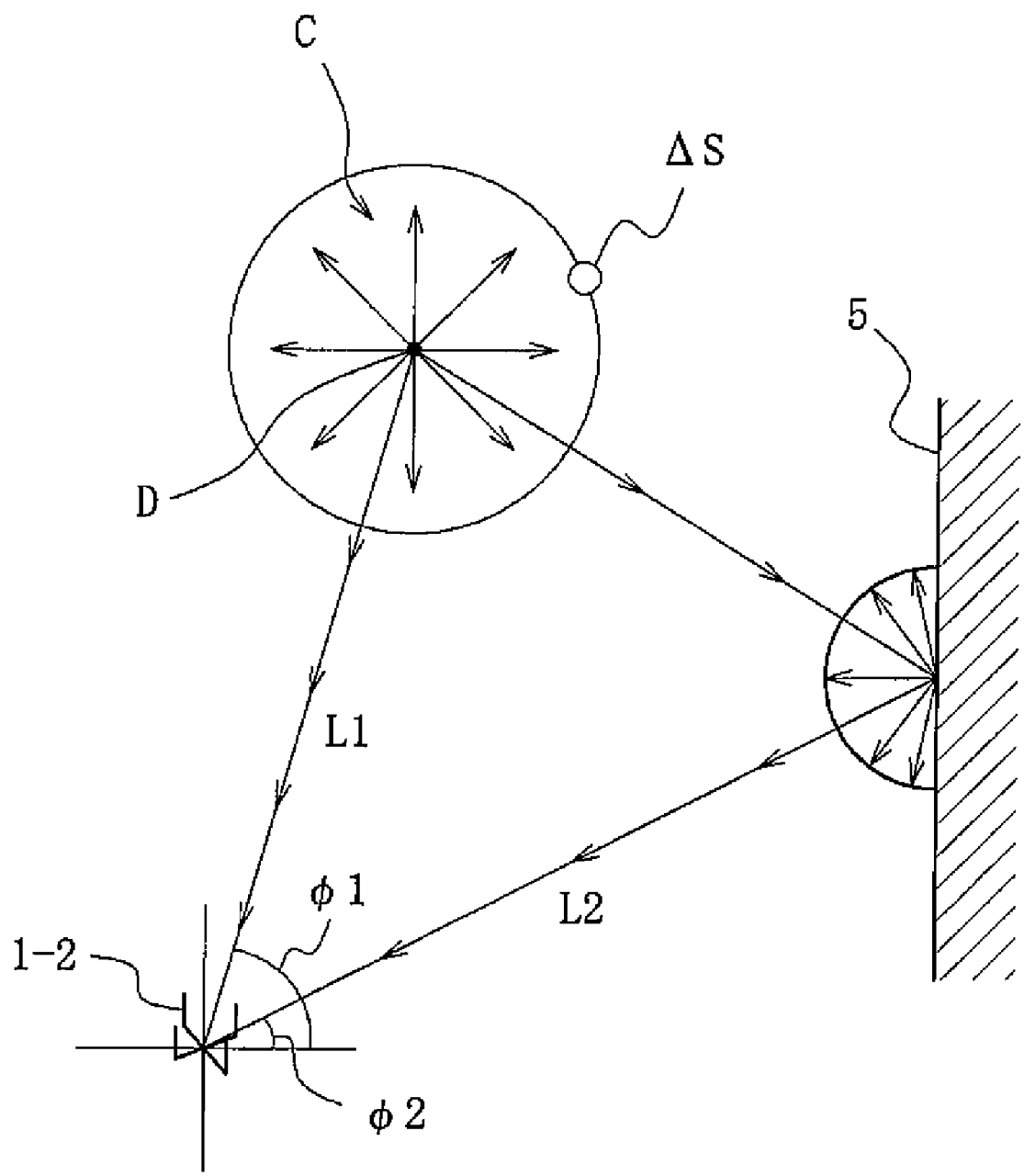
FIG. 7 is a diagram illustrating a calculation process of a weighting factor to the dead region.

Next comes a description of an example of the calculation process of the weight of the dead region B. First, as shown in FIG. 7, a desired dead region 13 is defined as a target region C and a desired point of the target region C is calculated as a representative point D in the voxel space. Then, rays of light are emitted from the representative point D to all directions by use of the ray tracing method. When hitting a building 5 and the likes, the ray of light is diffused into a predetermined number of rays based on the reflection property (for example, Lambert reflection) at a hitting point and a normal vector.

When a surviving value of the ray of light becomes equal to or less than a predetermined value because of an attenuation property according to a travel distance, the ray of light is eliminated (tracing is completed). At this point, the surviving value of the ray of light is calculated based on the attenuation property of the transmission power. More specifically, since the transmission power attenuates inversely proportion to the square of the distance, power P(R) passing through a minute area $\Delta S$ on the sphere having a distance R as a radius thereof fulfills $P(R)=\Delta S/(4\pi R^2)\times P$, provided that an original transmission power is defined as the P. Accordingly, when the surviving value P(R) becomes equal to or less than the predetermined value, the ray of light is eliminated. In this case, the original transmission power P is preferably the transmission power of the wireless base station 1-2 when a beam is directed, in consideration of directing a beam from the neighboring wireless base station (the wireless base station 1-2 in FIG. 6) at the end to the dead region C including the representative point D.

When the ray of light reaches the neighboring base station 1-2, a value in accordance with a light path and reflection (the power attenuated by an optical path length L and reflection) at that point is added as an electric field property at the representative point D and a trace of the ray of light is ended.

Subsequently, a virtual transmission power property is formed based on an arrival angle ø of the ray of light to the antenna of the neighboring wireless base station 1-2 and the surviving value of the ray of light. In this case, a beam direction of the antenna is a direction of the ray of light, among rays of light arriving at the wireless base station 1-2, having the maximum power when arriving at the wireless base station 1-2. However, in a case where there are a plurality of rays of light having the maximum power, a retardation (Ln/(1/f) is calculated from the optical path length Ln and a carrier frequency f of each of the rays of light. A histogram is obtained by segmentalizing the retardation at a specific angle, and a ray of light included in the segment with the highest number is defined as valid so as to define the direction of the ray of light as the beam direction.

In a case where rays of light reach not one neighboring wireless base station but a plurality of neighboring wireless base stations, total powers of rays of light by which a beam direction is determined for each wireless base station (the power when the ray of light arrives at the base station if there is a single ray of light, or total of a plurality of rays of light when they are selected) are compared to one another and a wireless base station with the highest total power is selected so that only the selected wireless base station directs a beam to the representative point.

Then, the third weighting factor is calculated from the virtual transmission power property so that a peak of the beam occurs in a direction with high surviving value and a null occurs in a direction with low surviving value.

In a case where a message indicating that a signal transmitted from the terminal 3 cannot be received is received from the wireless base station 1-1 communicating with the terminal 3 despite beam generation of the neighboring wireless base station 1-2 by use of the third weighting factor thus calculated, the third weighting factor is calculated in detail under a higher resolution condition than the condition of previous calculation of the weighting factor by, for example, increasing (doubling, for example) the number of rays of light from the representative point D (in a different direction), increasing the number of lays of light diffused at the reflection point (doubling, for example) or segmentalizing the voxel (for example, one side of the voxel is changed to correspond to from 10 m in a real space to 5 m, a half thereof).

As described above, the communication system of the present embodiment stores the location information indicating the interference region between the wireless base stations 1-1 and 1-2 neighboring each other, the first weighting factor W1 for the wireless base station 1-1 to direct a beam to the interference region and the second weighting factor W2 for the wireless base station 1-2 to direct a beam, correspondingly to one another in the interference table 2 of the communication control apparatus 2. The communication system of the present embodiment also stores the third weighting factor W3 used for one of the wireless base stations to generate a beam to interpolate a dead area of the other wireless base station by avoiding the interference region when the other wireless base station is communicating with the terminal 3 located in the interference region. In addition, for example, while the wireless base station 1-1 communicates with the terminal 3, the communication system obtains the weighting factors w1 and w2 adopted by the wireless base station 1-1 and the wireless base station 1-2, respectively, and judges whether the terminal 3 is located in the interference region according to whether there is the identical combination of the first weighting factor W1 and the second weighting factor W2 in the interference table 23. When the terminal 3 is located in the interference region as a result, the third weighting factor W3 is applied to the wireless base station 1-2 and the beam generation is controlled to prevent transmission waves of the wireless base station 1-2 from interfering with the terminal 3. Thereby, the interference region generated between the wireless base stations 1-1 and 1-2 neighboring each other is obtained in relation to the weighting factor of each wireless base station. Since it is possible to set the weighting factor reducing the interference region and the dead region between neighboring wireless base stations, it enables a stable communication without being interfered by the neighboring wireless base station 1-2.

Although the wireless base stations neighboring one another use the same frequency band in the first embodiment described above, it is also possible to effectively adopt the first embodiment even when the wireless base stations use different frequency bands if a radio wave transmitted from a neighboring wireless base station acts as an interfering radio wave. In addition, when the terminal 3 is located in the interference region in the first embodiment described above, since the dead region is influenced by a beam of another neighboring wireless base station, the third weighing factor W3 for controlling beam generation of the neighboring wireless base station is not stored in the interference table 23 but can be calculated each time and adopted based on the weighting factor w1 obtained from the wireless base station communicating with the terminal 3 and a weighting factor obtained from each neighboring wireless base station.

Second Embodiment

Figure 8:
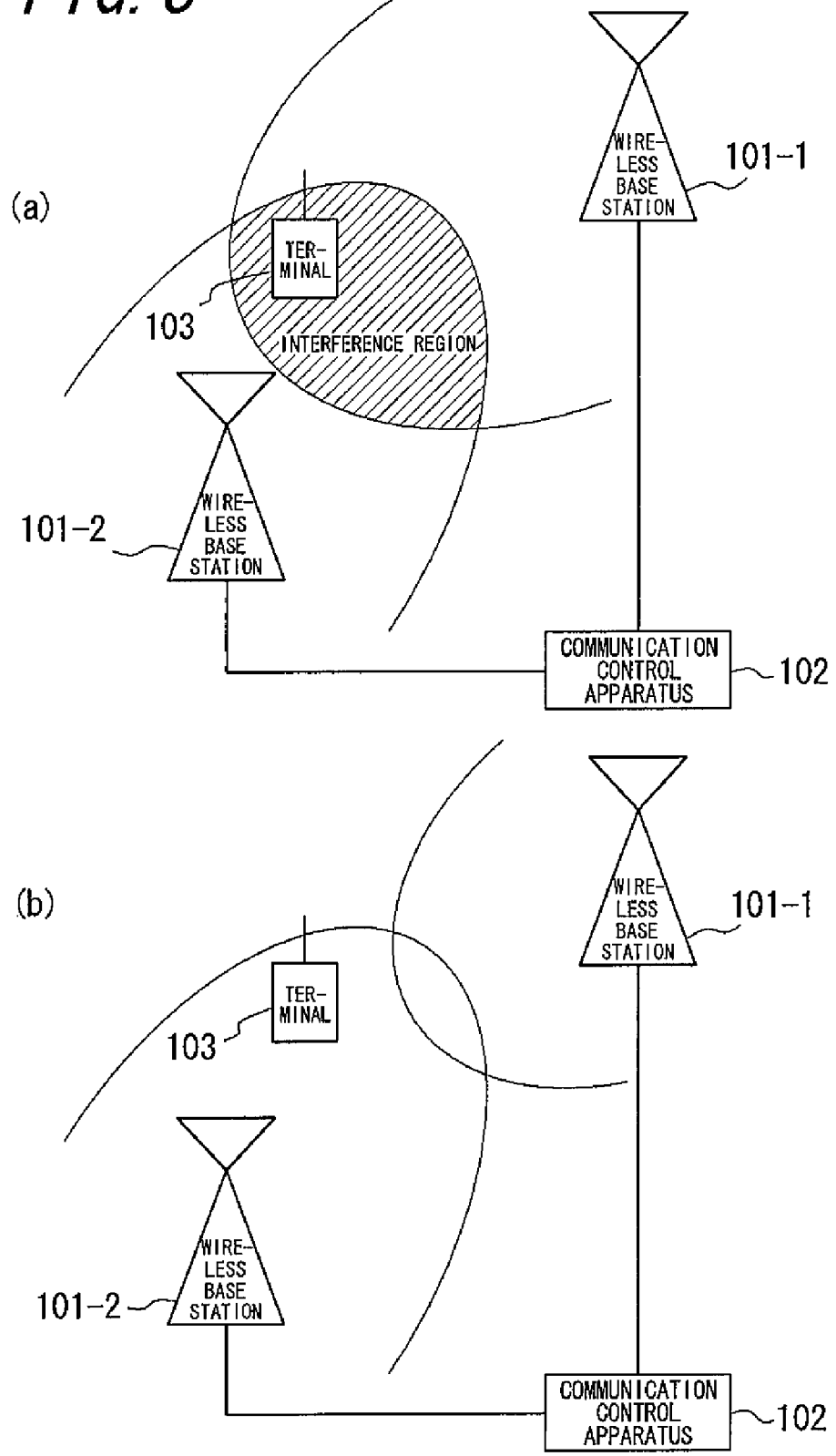
FIG. 8 is a diagram illustrating a principle of a communication system according to a second embodiment of the present invention.

FIG. 8 is a diagram illustrating a principle of a communication system according to a second embodiment of the present invention. The communication system shown in FIG. 8 is provided with a plurality of wireless base stations 101-1, 101-2, . . . and a communication control unit 102 for controlling the plurality of wireless base stations. Each of the wireless base stations 101-1, 101-2, . . . (hereinafter referred to as a wireless base station 101 when indicating a single wireless base station) is capable of wirelessly communicating with a terminal (wireless communication apparatus) 103 in a communication area of the wireless base station 101 by use of the same frequency band and TDD with frame synchronization between the wireless base stations. In addition, each wireless base station 101 has a plurality of antennas and adopts an adaptive array antenna to improve a link state by controlling directionality of the antenna to the terminal 103 communication therewith.

In the communication system of the present embodiment, as shown in FIG. 8(a) for example, when the wireless base station 101-1 fails to receive a signal transmitted from the terminal 103 while communicating therewith, the wireless base station 101-1 notifies the communication control apparatus 102 of the failure. Thereby, the communication control apparatus 102 judges whether the terminal 103 is located in the interference region. When the terminal 103 is located in the interference region by the neighboring wireless base station 101-2 as a result as shown in FIG. 8(a), the communication control apparatus 102 informs the wireless base station 101-1 being in communication of that effect. Thereby, the wireless base station 101-1 stops transmission or reduces transmission output to the terminal 103 and, as shown in FIG. 8(b), controls the terminal 103 to perform handover to the wireless base station 101-2.

Figure 9:
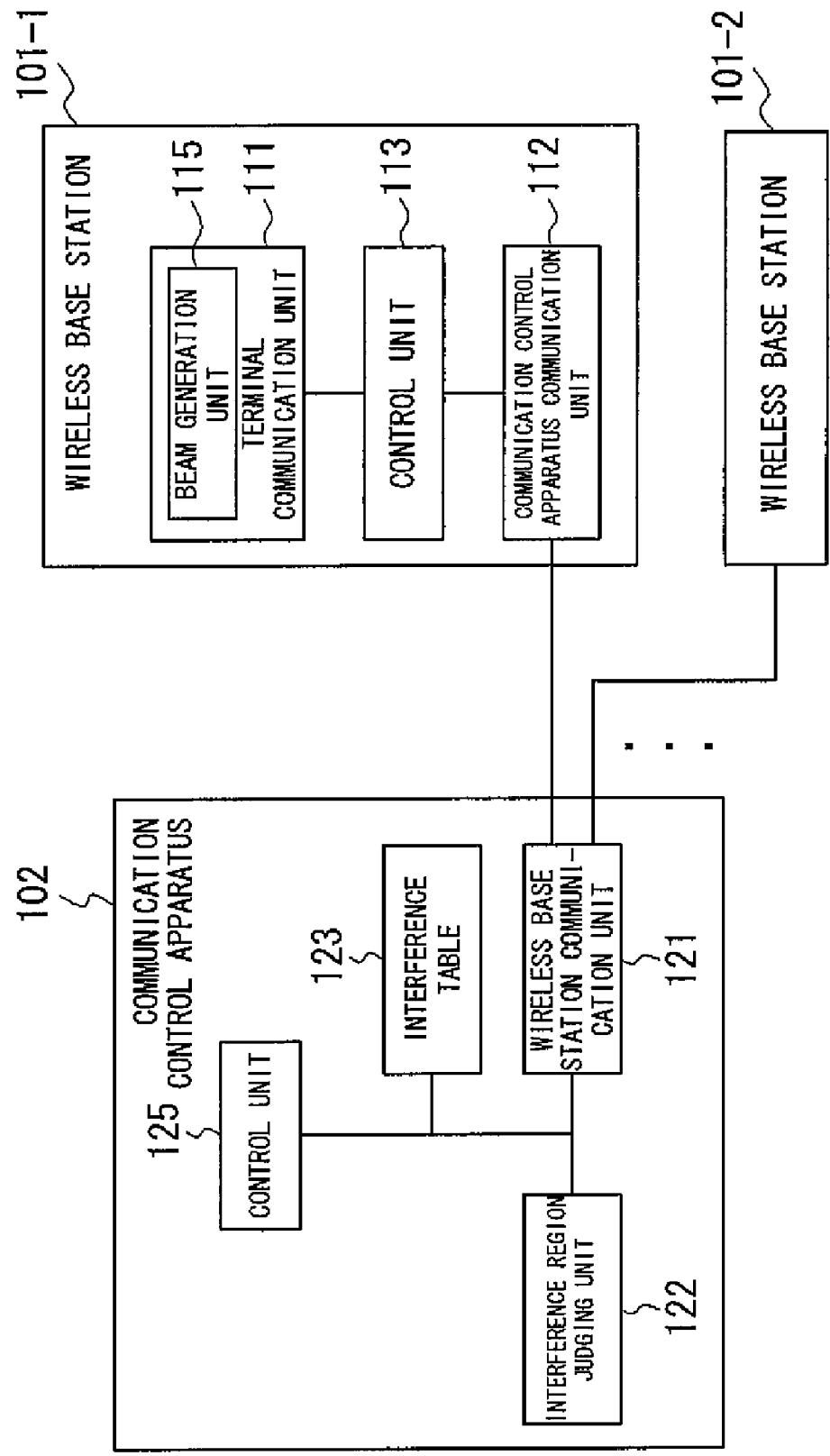
FIG. 9 is a functional block diagram illustrating a schematic constitution of main sections of each wireless base station and a communication control apparatus in the communication system shown in FIG. 8.

FIG. 9 is a functional block diagram illustrating a schematic constitution of main sections of each wireless base station 101 and a communication control apparatus 102 in the communication system shown in FIG. 8. Each wireless base station 101 is similarly constituted and provided with a terminal communication unit 111 for wirelessly communicating with a terminal, a communication control apparatus communication unit 112 for wiredly or wirelessly communicating with the communication control apparatus 102, and a control unit 113 for controlling the entire operation. The terminal communication unit 111 has a beam generation unit 115 for controlling the directionality of the antenna according to a weighting factor calculated based on a signal received from a terminal in communication.

The communication control apparatus 102 is provided with a wireless base station communication unit 121 including a transmission unit and a reception unit for communicating with the wireless base station 101, an interference region judging unit 122, an interference table 123, and a control unit 125 for controlling the apparatus entirely.

In the present embodiment, the interference table 123 stores location information indicating an interference region by the wireless base stations 101-1 and 101-2 neighboring each other, the first weighting factor for the wireless base station 101-1 to direct a beam to the interference region, and the second weighting factor for the wireless base station 101-2 to direct a beam, correspondingly to one another according to a recording format similar to those shown in FIG. 4 and FIG. 5, for example.

Specific operations of the present embodiment will be described with reference to a flow chart shown in FIG. 10.

For example, when the wireless base station 101-1 communicates with the terminal 103, the wireless base station 101-1 calculates a weighting factor adopted for the beam generation unit 115 to direct a beam to the terminal 103 based on a signal received from the terminal 103 (step S51), and assigns a band to the terminal 103 (step S52) to start the communication.

Then, when the terminal communication unit 111 of the wireless base station 101-1 fails to receive a signal transmitted from the terminal 103 during the communication (step S53), the communication control apparatus communication unit 112 transmits the weighting factor adopted for the beam generation at that point to the communication control apparatus 102 and inquires the communication control apparatus 102 about whether the terminal 103 is located in the interference region.

When receiving the inquiry about the interference region from the wireless base station 101-1 via the wireless base station communication unit 121, the communication control apparatus 102 obtains a weighting factor adopted for a beam generation by the neighboring wireless base station 101-2 at that point from the wireless base station 101-2 via the wireless base station communication unit 121. Then, the interference region judging unit 122 searches for an identical combination based on a comparison of actual weighting factors obtained from the wireless base stations 101-1 and 101-2 and the first and the second weighting factors stored in the interference table 123. When there is the identical combination as a result, the terminal 103 is judged as being located in the interference region, while the terminal 103 is judged as not being located in the interference region when there is no identical combination (step S54).

At this point, when the terminal 103 is judged as being located in the interference region by the wireless base station 101-2, the communication control apparatus 102 informs the wireless base station 101-1 of that effect via the wireless base station communication unit 121. Thereby, the terminal communication unit 111 of the wireless base station 101-1 controls to stop transmission or to reduce the transmission output to the terminal 103 (step S55) and prompts the terminal 103 to perform handover to the wireless base station 101-2 as shown in FIG. 8(b).

More specifically, since the terminal 103 in the interference region receives signals from the wireless base station 101-1 and the neighboring wireless base station 101-2 in mixture, the terminal 3 cannot receive (decode) either of the signals because of the reception intensity thereof for each signal at a comparable level. However, by stopping the transmission or reducing the transmission output from the wireless base station 101-1 to the terminal 103 as described above, the reception intensity of the terminal 103 for the signal from the wireless base station 101-1 lowers, which leads to burial of the signal from the wireless base station 101-1 in the signal from the wireless base station 101-2 when the reception intensity for the signal from the wireless base station 101-2 is not changed. As a result, the terminal 103 cannot receive the signal from the wireless base station 101-1 with which the terminal 103 has been connecting wirelessly but can receive the signal from the wireless base station 101-2, which rises a request for handover from the wireless base station 101-1 to the wireless base station 101-2. It thus enables smooth handover of the terminal 103 from the wireless base station 101-1 to the wireless base station 101-2.

In a case where the wireless base station 101-1, after reducing the transmission power or stopping the transmission to the terminal 103, traces a transmission condition of the terminal 103 and cannot confirm in a predetermined period that the terminal 103 has performed handover to another wireless base station, the wireless base station 101-1 reinstates the transmission power and resumes the communication. In addition, when the terminal 103 is judged as not being located in the interference region by the wireless base station 101-2 at the step S54, the wireless base station 101-1 controls the terminal communication unit 111 so as to increase the transmission power to the terminal 103, for example.

Accordingly, the terminal communication unit 111 of each wireless base station 101 in the present embodiment constitutes a signal detection unit for detecting whether a signal transmitted from the terminal communicating with the corresponding wireless base station 101 is received and a transmission control unit for controlling transmission to the terminal in the communication.

As described above, in the communication system of the present embodiment, when the wireless base station 101-1 cannot receive a signal transmitted from the terminal 103 during communication therewith, the communication control apparatus 102 judges whether the terminal 103 is located in the interference region by referring to the interference table 123. When the terminal 103 is located in the interference region as a result, the transmission of the wireless base station 101-1 is controlled so that the terminal 103 perform handover to the neighboring wireless base station 101-2. It is thus possible to perform handover of the terminal 103 promptly to the neighboring wireless base station 101-2 by reducing the period (dead period) for the terminal 103 to stay in the interference region, which enables to ensure stability in communication.

Although the neighboring wireless base stations use the same frequency band in the second embodiment described above, it is also possible to effectively adopt a configuration of the second embodiment even when different frequency bands are used, in a case where a radio wave transmitted from a neighboring wireless base station acts as an interfering radio wave. In addition, when the wireless base station 101-1 communicating with the terminal 103 cannot receive a signal transmitted therefrom, although the communication control apparatus 102 judges by use of the interference table 123 whether the terminal 103 is located in the interference region in the second embodiment described above, it is also possible to configure so that, without using the interference table 123, it is assumed that there is a high possibility for terminal 103 to be located in the interference region and the transmission to the terminal 103 is controlled to prompt handover of the terminal 103 to the neighboring wireless base station. Moreover, although the wireless base terminal 101-1 communicating with the terminal 103 judges whether the terminal 103 is located in the interference region by detecting reception of a signal transmitted from the terminal 103 in the second embodiment described above, it is also possible to judge whether the terminal 103 is located in the interference region based on a comparison of the weighting factor adopted to the wireless base station 101-1 and the contents of the interference table, without detecting the reception of a signal transmitted from the terminal 103.

In addition, although the location information indicating the interference region by the wireless base stations 101-1 and 101-2 neighboring each other, the first weighting factor for the wireless base station 101-1 to direct a beam to the interference region and the second weighting factor for the wireless base station 101-2 to direct a beam are stored correspondingly to one another in the interference table 123 in the second embodiment described above, each wireless base station may store location information indicating an interference region where communication is interfered by a neighboring wireless base station and a weighing factor for at least a corresponding wireless base station to direct a beam to the interference region, correspondingly to one another. In such a case, based on a comparison of the weighting factor obtained from the wireless base station 101-1 in communication with the corresponding weighting factor of the wireless base station 101-1 stored in the interference table 123, a difference value of the weighting factors for each antenna is calculated, for example, and the terminal 103 is judged as being located in the interference region when dispersion of the difference values of the weighting factors is in a certain value. In this case, although it is not possible to specify which one of the neighboring wireless base stations is transmitting a radio wave which may cause the interference, it means that it is highly possible that the terminal 103 is located in a region which may cause the interference with another wireless base station. In addition, when this judging method is adopted, and when the wireless base station 101-1 controls the transmission to the terminal 103 and the terminal 103 performs handover to the wireless base station 101-2, the weighting factor of the wireless base station 101-1 at the point when it is judged as an interference and the weighting factor of the wireless base station 101-2, a handover destination, are stored correspondingly to one another in the interference table 123.

The invention claimed is:

1. A communication control method for a communication system including a plurality of wireless base stations having adaptive array antennas and a communication control apparatus for controlling the plurality of wireless base stations, comprising:

storing location information indicating an interference region by a first wireless base station and a second wireless base station neighboring each other among the plurality of wireless base stations, a first weighting factor for the first wireless base station to direct a beam to the interference region, and a second weighting factor for the second wireless base station to direct a beam to the interference region, correspondingly to one another in an interference table;

obtaining weighting factors adopted by the first base station and the second base station respectively while the first wireless base station communicates with a wireless communication apparatus, and judging whether the wireless communication apparatus is located in the interference region by the second wireless base station based on a comparison of the weighting factors obtained and the first and the second weighting factors stored in the interference table; and controlling beam generation of the second wireless base station, when the wireless communication apparatus is located in the interference region, so as to prevent a radio wave transmitted from the second wireless base station from interfering with the wireless communication apparatus.

2. The communication control method according to claim 1, further comprising:

in order to store the location information, the first weighting factor and the second weighting factor in the interference table, an obtainment step for obtaining information on a communication quality required for the wireless communication apparatus wirelessly connected to the first wireless base station;

a determination step for determining whether the communication quality required for the wireless communication apparatus meets a predetermined quality based on the obtained information on the communication quality;

a second weighting factor calculation step for calculating the second weighting factor so that the second wireless base station directs a beam to an interference region confirmation objective apparatus by defining the wireless communication apparatus as the interference region confirmation objective apparatus and based on location information obtained from the interference region confirmation objective apparatus, when the communication quality does not meet the predetermined quality as a result of the determination; and a signal obtainment recognition step for recognizing, after the second wireless base station generates a beam based on the second weighting factor calculated, whether the first wireless base station has obtained a signal from the interference region confirmation objective apparatus, wherein when the first wireless base station has not obtained a signal from the interference region confirmation objective apparatus as a result of the recognition, the interference region confirmation objective apparatus is assumed to be located in the interference region by the first wireless base station and the second wireless base station, and the first weighting factor used by the first wireless base station to direct a beam to the interference region confirmation objective apparatus, the second weighting factor calculated in the second weighting factor calculation step, and the location information obtained from the interference region confirmation objective apparatus are stored correspondingly to one another in the interference table.

3. The communication control method according to claim 2, wherein a band corresponding to the communication quality is obtained and a band for confirmation of the interference region is assigned for the interference region confirmation objective apparatus.

4. The communication control method according to claim 1, further comprising:

in order to store the location information, the first weighting factor and the second weighting factor in the interference table, a judgment step for judging whether location information obtained from the wireless communication apparatus wirelessly connected to the first wireless base station is stored in the interference table;

an obtainment step for obtaining information on a communication quality required for the wireless communication apparatus when the location information obtained from the wireless communication apparatus is not stored in the interference table as a result of the judgment;

a determination step for determining whether the communication quality required for the wireless communication apparatus meets a predetermined quality based on the obtained information on the communication quality;

a second weighting factor calculation step for calculating the second weighting factor so that the second wireless base station directs a beam to an interference region confirmation objective apparatus by defining the wireless communication apparatus as the interference region confirmation objective apparatus and based on the location information obtained from the interference region confirmation objective apparatus, when the communication quality does not meet the predetermined quality as a result of the determination; and a signal obtainment recognition step for recognizing, after the second wireless base station generates a beam based on the second weighting factor calculated, whether the first wireless base station has obtained a signal from the interference region confirmation objective apparatus, wherein when the first wireless base station has not obtained a signal from the interference region confirmation objective apparatus as a result of the recognition, the interference region confirmation objective apparatus is assumed to be located in the interference region by the first wireless base station and the second wireless base station, and the first weighting factor used by the first wireless base station to direct a beam to the interference region confirmation objective apparatus, the second weighting factor calculated in the second weighting factor calculation step, and the location information obtained from the interference region confirmation objective apparatus are stored correspondingly to one another in the interference table.

5. The communication control method according to claim 4, wherein a band corresponding to the communication quality is obtained and a band for confirmation of the interference region is assigned for the interference region confirmation objective apparatus.

6. A communication system including a plurality of wireless base stations having adaptive array antennas and a communication control apparatus for controlling the plurality of wireless base stations, wherein each of the plurality of wireless base stations comprises:

a communication control apparatus communication unit for transmitting a weighting factor adopted for beam generation to the communication control apparatus and receiving a weighting factor from the communication control apparatus, and the communication control apparatus comprises:

a reception unit for receiving the weighting factor transmitted from each of the wireless base stations;

an interference table for storing location information indicating an interference region by a first wireless base station and a second wireless base station neighboring each other among the plurality of wireless base stations, a first weighting factor for the first wireless base station to direct a beam to the interference region and a second weighting factor for the second wireless base station to direct a beam to the interference region, correspondingly to one another;

an interference region judging unit for obtaining weighting factors adopted by the first base station and the second base station respectively while the first wireless base station communicates with a wireless communication apparatus and judging whether the wireless communication apparatus is located in the interference region by the second wireless base station based on a comparison of the weighting factors obtained and the first and the second weighting factors stored in the interference table;

a weighting factor calculation unit for calculating a third weighting factor for controlling beam generation of the second wireless base station so as to prevent a radio wave transmitted from the second wireless base station from interfering with the wireless communication apparatus based on the weighting factor of the first wireless base station received by the reception unit, when the wireless communication apparatus is judged as being located in the interference region by the interference region judging unit; and a transmission unit for transmitting the third weighting factor calculated to the second wireless base station, wherein beam generation of the second wireless base station is controlled based on the third weighting factor transmitted from the communication control apparatus.

7. A communication control apparatus for controlling a plurality of wireless base stations having adaptive array antennas, comprising:

a weighting factor obtainment unit for obtaining a weighting factor adopted for beam generation from each of the plurality of wireless base stations;

an interference table for storing location information indicating an interference region by a first wireless base station and a second wireless base station neighboring each other among the plurality of wireless base stations, a first weighting factor for the first wireless base station to direct a beam to the interference region and a second weighting factor for the second wireless base station to direct a beam to the interference region, correspondingly to one another;

an interference region judging unit for obtaining weighting factors adopted by the first base station and the second base station respectively while the first wireless base station communicates with a wireless communication apparatus and judging whether the wireless communication apparatus is located in the interference region by the second wireless base station based on a comparison of the weighting factors obtained and the first and the second weighting factors stored in the interference table;

a weighting factor calculation unit for calculating a third weighting factor for controlling beam generation of the second wireless base station so as to prevent a radio wave transmitted from the second wireless base station from interfering with the wireless communication apparatus based on the weighting factor of the first wireless base station obtained by the weighting factor obtainment unit, when the wireless communication apparatus is judged as being located in the interference region by the interference region judging unit; and a transmission unit for transmitting the third weighting factor calculated to the second wireless base station.

8. A communication control method for a communication system including a plurality of wireless base stations having adaptive array antennas and a communication control apparatus for controlling the plurality of wireless base stations, comprising:

storing location information indicating an interference region where communication of each of the wireless base stations is interfered by a neighboring wireless base station and a weighting factor for the wireless base station to direct a beam at least to the interference region, correspondingly to each other in an interference table;

obtaining a weighting factor adopted at least by a first wireless base station while a wireless communication apparatus communicates with the first wireless base station among the plurality of wireless base stations, and judging whether the wireless communication apparatus is located in the interference region based on a comparison of the weighting factor obtained and a weighting factor of a corresponding wireless base station stored in the interference table; and controlling transmission of the first wireless base station so that the wireless communication apparatus performs handover to a second wireless base station neighboring the first wireless base station, when the wireless communication apparatus is located in the interference region as a result.

9. The communication control method according to claim 8, further comprising detecting whether there is reception of a signal transmitted from the wireless communication apparatus by the first wireless base station communicating with the wireless communication apparatus, and judging whether the wireless communication apparatus is located in the interference region when the reception of a signal transmitted from the wireless communication apparatus is failed.

10. The communication control method according to claim 9, wherein transmission of the first wireless base station is stopped or an transmission output of the first wireless base station is reduced when the wireless communication apparatus is located in the interference region.

11. The communication control method according to claim 8, wherein transmission of the first wireless base station is stopped or a transmission output of the first wireless base station is reduced when the wireless communication apparatus is located in the interference region.

12. A communication system including a plurality of wireless base stations having adaptive array antennas and a communication control apparatus for controlling the plurality of wireless base stations, wherein each of the plurality of wireless base stations comprises:
a communication control apparatus communication unit for transmitting a weighting factor adopted for beam generation to the communication control apparatus and receiving a judging result about an interference region from the communication control apparatus, and the communication control apparatus comprises:
a reception unit for receiving the weighting factor transmitted from each of the wireless base stations;

an interference table for storing location information indicating an interference region where communication of each of the wireless base stations is interfered by a neighboring wireless base station and a weighting factor for the wireless base station to direct a beam at least to the interference region, correspondingly to each other;

an interference region judging unit for obtaining a weighting factor adopted by a first base station while a wireless communication apparatus communicates with the first wireless base station among the plurality of wireless base stations and judging whether the wireless communication apparatus is located in the interference region based on a comparison of the weighting factor obtained and a weighting factor of a corresponding wireless base station stored in the interference table; and a transmission unit for transmitting a judging result about the interference region by the interference region judging unit to the first wireless base station, wherein transmission of the first wireless base station is controlled so that the wireless communication apparatus performs handover to a second wireless base station neighboring the first wireless base station when the wireless communication apparatus is judged as being located in the interference region by the interference region judging unit.

* * * * *